(12) United States Patent
Saraf et al.

(10) Patent No.: US 11,189,100 B2
(45) Date of Patent: Nov. 30, 2021

(54) SYSTEMS AND METHODS FOR OPTIMIZING EXTENDED REALITY EXPERIENCES

(71) Applicant: Verizon Patent and Licensing Inc., Arlington, VA (US)

(72) Inventors: Rohit Shirish Saraf, Nashua, NH (US); John A. Turato, Garden City South, NY (US); Stephane Chaysinh, Basking Ridge, NJ (US)

(73) Assignee: Verizon Patent and Acessing Inc., Basking Ridge, NJ (US)

( * ) Notice: Subject to any disclaimer, the term of this patent is extended or adjusted under 35 U.S.C. 154(b) by 4 days.

(21) Appl. No.: 16/694,894

(22) Filed: Nov. 25, 2019

(65) Prior Publication Data
US 2021/0158620 A1  May 27, 2021

(51) Int. Cl.
*G06T 19/00* (2011.01)
*H04W 48/18* (2009.01)
*G06F 3/01* (2006.01)
*H04W 48/08* (2009.01)
*H04W 88/06* (2009.01)
*H04W 36/14* (2009.01)
*H04W 48/16* (2009.01)

(52) U.S. Cl.
CPC ............ *G06T 19/006* (2013.01); *G06F 3/011* (2013.01); *G06F 3/017* (2013.01); *H04W 36/14* (2013.01); *H04W 48/08* (2013.01); *H04W 48/16* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2016/0026253 A1* | 1/2016 | Bradski | H04N 13/344 345/8 |
| 2017/0018024 A1* | 1/2017 | Xu | G06Q 30/0643 |
| 2018/0336728 A1* | 11/2018 | Edwards | G06Q 10/063 |
| 2020/0169717 A1* | 5/2020 | Zavesky | G06K 9/6202 |
| 2020/0327740 A1* | 10/2020 | Frommhold | G06T 15/405 |
| 2020/0372714 A1* | 11/2020 | Soryal | G16H 30/20 |
| 2021/0110610 A1* | 4/2021 | Xu | G02B 27/017 |

OTHER PUBLICATIONS

Chen et al. (NPL, "Artificial Neural Networks-Based Machine Learning for Wireless Networks: A Tutorial") (Year: 2019).*

* cited by examiner

*Primary Examiner* — Hilina K Demeter

(57) ABSTRACT

A device may receive, from a user device, a request to activate an extended reality experience. The device may obtain access network information relating to a set of access networks available to the user device and user device information relating to the user device. Based on the access network information and the user device information, the device may determine an access network to use for the extended reality experience. The device may determine, based on the access network, a first portion of the extended reality experience to execute locally or a second portion of the extended reality experience to execute remotely.

20 Claims, 11 Drawing Sheets

SYSTEMS AND METHODS FOR OPTIMIZING EXTENDED REALITY EXPERIENCES

BACKGROUND

Extended reality (XR), such as augmented reality (AR), virtual reality (VR), mixed reality (MR), and/or the like, may integrate real and virtual elements and/or audio to create an immersive experience. An individual may wish to use a user device (e.g., a headset, glasses, smartphone, tablet, and/or the like) to launch an XR experience on a network. In some cases, the network and/or the user device may have a requisite capability but nevertheless be unable to deliver and/or execute the XR experience.

DETAILED DESCRIPTION OF PREFERRED EMBODIMENTS

Figure 1A:
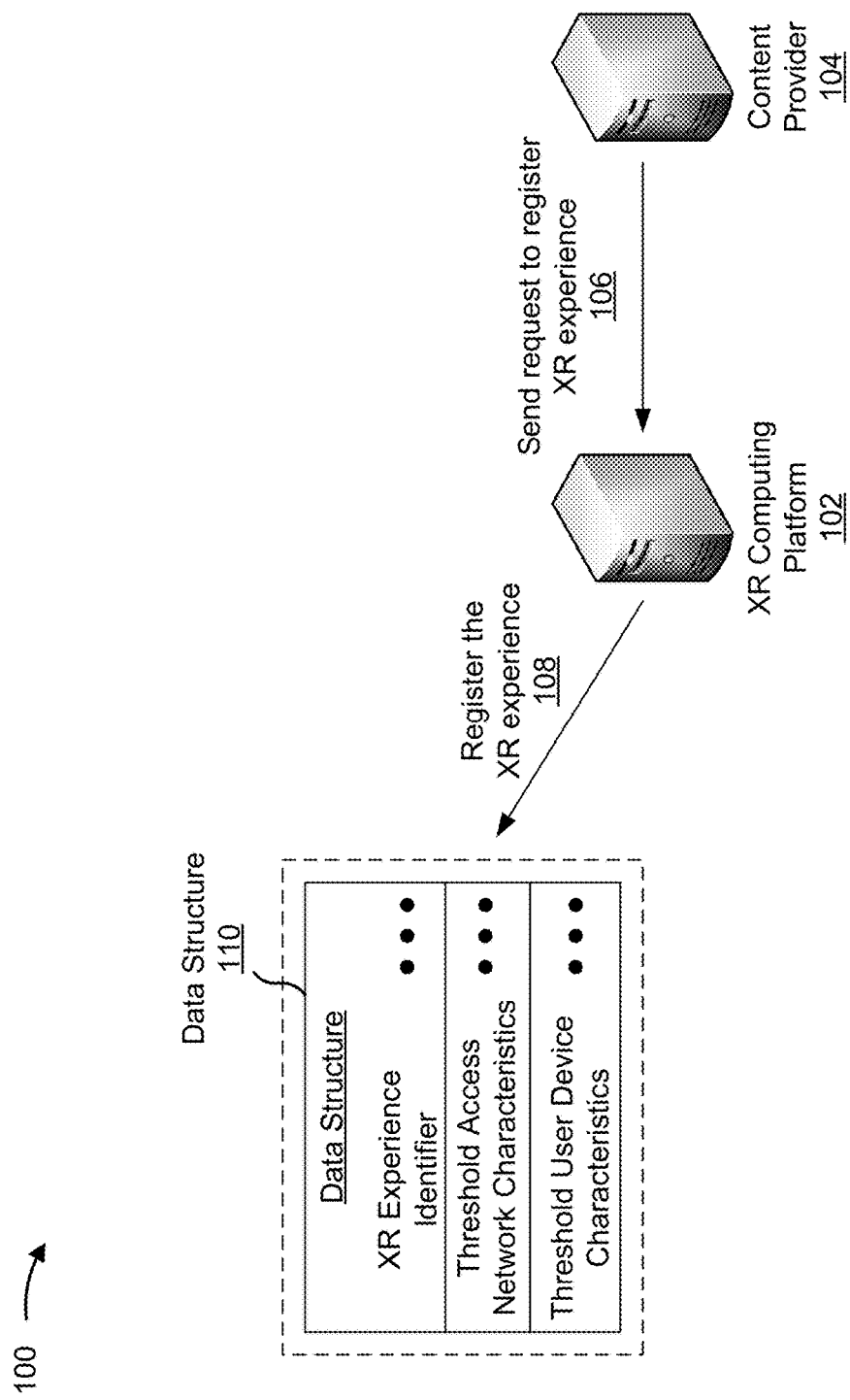
FIGS. 1A-1G are diagrams of one or more example implementations described herein.

The following detailed description of example implementations refers to the accompanying drawings. The same reference numbers in different drawings may identify the same or similar elements.

Extended reality (XR) technology may provide immersive experiences to a user via a user device (e.g., a headset, glasses, a smartphone, tablet, and/or the like). Depending on a type of XR experience (e.g., whether the XR experience is augmented reality (AR), virtual reality (VR), and/or the like), the XR experience may provide a different level of immersion to the user. For example, in an AR experience, digital objects (e.g., images, text, animation, and/or the like) may be overlaid on the real world. As another example, in a VR experience, a user may be immersed in a wholly simulated digital environment (e.g., walking on the moon, and/or the like) by using a head-mounted display. The wholly simulated digital environment may be a real environment or an imaginary environment.

To provide a blend of virtual and real-world elements and/or a convincing level of immersion, the XR technology may call for particular access network characteristics (e.g., latency, download speed, upload speed, bandwidth, and/or the like) to deliver the XR experience to the user device. For example, the XR technology may require a particular latency (e.g., latency that satisfies a threshold, such as less than about 25 milliseconds (ms)) in order for the user device to properly render and/or timely display virtual objects. Additionally, or alternatively, the XR technology may call for particular user device characteristics (e.g., a type of the user device, a capability of the user device, a location of the user device, a velocity of the user device, and/or the like) to execute the XR experience. For example, the XR technology may require a particular processing capability in order for the user device to adequately process the XR experience.

In some instances, the user device may be capable of launching the XR experience but may nevertheless fall short of performance potential due to access network selection. For example, at a given time, a number of networks (e.g., a third generation (3G) network, a fourth generation (4G) network, a fifth generation (5G) network, a Wi-Fi network, and/or the like) may be available to the user device. However, because network handover decisions may not factor in XR experience performance, the XR experience may be delivered via an access network having sub-optimal characteristics (e.g., due to over-crowding, insufficient speed, limited bandwidth, excessive latency, and/or the like) relative to another available access network. Such a sub-optimal selection of the access network may impact user experience, contribute to an unbalanced distribution of network traffic, and waste resources. In particular, the sub-optimal selection may waste computing resources (e.g., processing resources, memory resources, power resources, communication resources, and/or the like) by attempting to execute and/or render the XR experience. Similarly, the sub-optimal selection may also waste network resources by increasing network overhead in attempting to receive and/or deliver data for the XR experience.

In some instances, the user device may include hardware to execute and/or render the XR experience but may nevertheless be unable to do so adequately due to insufficient memory, processing power, battery life, and/or the like. Because the XR experience may be limited to local execution on the user device, deployment of the XR experience may be underinclusive. Furthermore, such a constraint on processing may impact user experience and waste resources (e.g., processing resources, memory resources, power resources, network resources, and/or the like).

Some implementations described herein provide a device (e.g., an XR computing platform and/or the like) that determines an optimal manner in which to deliver and/or execute the XR experience. The device may receive, from a user device, a request to activate the XR experience. In response, the device may obtain access network information relating to a set of access networks available to the user device, and user device information relating to the user device. The device may determine, based on the access network information and the user device information, an access network, of the set of access networks, to use for the XR experience. The device may determine, based on the access network, a first portion of the XR experience to execute locally at the user device or a second portion of the XR experience to execute remotely from the user device. The device may send an instruction to the user device to cause the user device to use the access network for the XR experience and execute the first portion locally or the second portion remotely.

By dynamically determining (e.g., in real time or substantially real time) the access network that is best suited for the XR experience, the device may improve user experience, help to distribute traffic across different access networks, and conserve resources. In particular, the device may conserve computing resources (e.g., processing resources, memory resources, power resources, communication resources, and/or the like) that might otherwise be wasted attempting to execute and/or render the XR experience at a sub-optimal level. The device may also conserve network resources that might otherwise be wasted attempting to receive and/or deliver data for the XR experience.

By dynamically determining the manner in which to execute the XR experience, including the possibility of executing the XR experience remotely from the user device, the device may further improve the user experience and conserve resources (e.g., processing resources, memory resources, power resources, network resources, and/or the like).

Figure 1B:
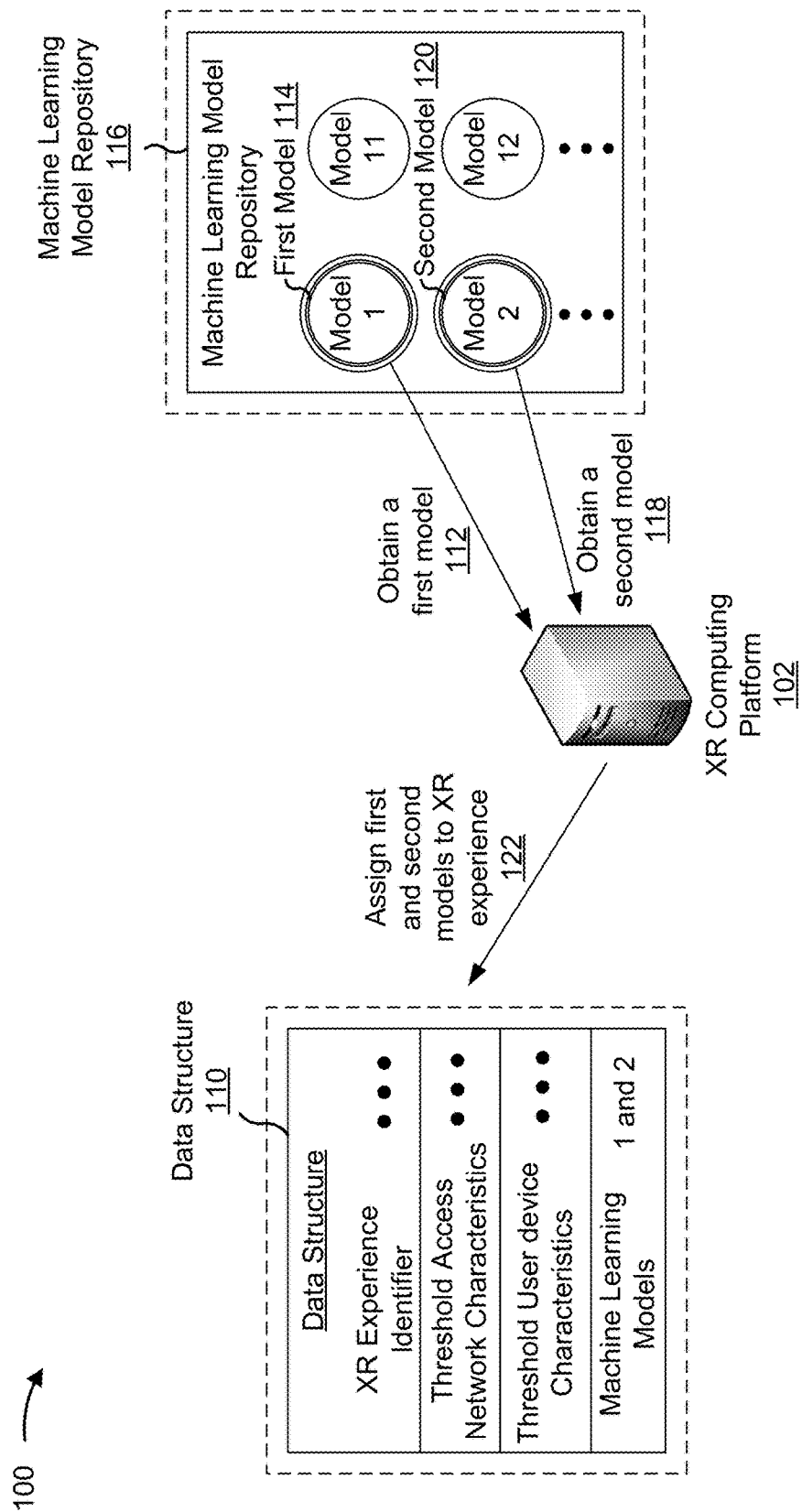

FIGS. 1A-1G are diagrams of one or more example implementations 100 described herein. FIGS. 1A-1B illustrate one or more examples of an extended reality (XR) computing platform 102 performing actions in response to receiving a request to register an XR experience. FIGS. 1C-1G illustrate one or more examples of the XR computing platform 102, and one or more additional devices, performing actions in response to the XR computing platform 102 receiving a request to activate the XR experience.

In FIG. 1A, assume a content provider 104 has created and/or made available the XR experience to one or more user devices. To enable the one or more user devices to communicate with the XR computing platform 102 regarding the XR experience, the content provider 104 may send, via one or more packets, a request to register the XR experience to the XR computing platform 102, as shown by reference number 106. The request may include XR experience information relating to the XR experience to allow the XR computing platform 102 to make determinations regarding delivery of the XR experience to the one or more user devices.

In some implementations, the XR experience information may include one or more threshold user device characteristics to activate the XR experience via the one or more user devices. The one or more threshold user device characteristics, in reference to a particular user device (e.g., of the one or more user devices, separate from the one or more user devices, and/or the like), may include a threshold type of the particular user device (e.g., an iPhone 8, an Oculus Go headset, and/or the like), a threshold capability of the particular user device (e.g., threshold processing capability, threshold memory capability, threshold power capability, threshold communication capability, and/or the like), a threshold location of the particular user device (e.g., threshold geographic coordinates within a cell, a threshold cell identifier, a threshold distance from a network device, and/or the like), a threshold velocity of the particular user device, and/or the like.

Additionally, or alternatively, the XR experience information may include one or more optimal user device characteristics to activate the XR experience at an optimal level. Similar to that described above, the one or more optimal user characteristics, in reference to the particular user device, may include an optimal type of the particular user device (e.g., an iPhone X, Valve Index headset, and/or the like), an optimal capability (e.g., optimal processing capability, optimal memory capability, optimal power capability, optimal communication capability, and/or the like), an optimal location of the particular user device (e.g., optimal geographic coordinates within a cell, an optimal cell identifier, an optimal distance from a network device, and/or the like), an optimal velocity of the particular user device, and/or the like.

Additionally, or alternatively, the XR experience information may include one or more threshold access network characteristics to activate the XR experience via the one or more user devices. The one or more threshold access network characteristics, in reference to a particular access network, may include a threshold type of the particular access network (e.g., a 3G network, a 4G network, a 5G network, a Wi-Fi network, and/or the like), a threshold download speed of the particular access network (e.g., about 25 megabytes per second (Mbps), and/or the like), a threshold upload speed of the particular access network (e.g., about 15 Mbps, and/or the like), a threshold latency of the particular access network (e.g., about 20 ms, and/or the like), and/or the like.

Additionally, or alternatively, the XR experience information may include one or more optimal access network characteristics to activate the XR experience at the optimal level. The one or more optimal access network characteristics, in reference to the particular access network, may include an optimal type of the particular access network (e.g., a 5G network, a Wi-Fi network, and/or the like), an optimal download speed of the particular access network (e.g., about 85 Mbps, and/or the like), an optimal upload speed of the particular access network (e.g., about 75 Mbps, and/or the like), an optimal latency of the particular access network (e.g., about 10 ms, and/or the like), and/or the like.

The types of characteristics identified above are provided merely as examples. In practice, other types of characteristics may additionally, or alternatively, be used to assess whether a particular user device may activate an extended reality experience. In some implementations, a single characteristic may be used. In some implementations, a combination of characteristics may be used. Furthermore, over time, the types of characteristics may evolve as a result of machine learning, user feedback, and/or the like. For example, the types of characteristics may be different for different types of user devices (e.g., a Samsung Galaxy Note 10, an iPhone 8, an Oculus Go headset, and/or the like).

Upon receipt of the request, and as shown by reference number 108, the XR computing platform 102 may register the XR experience. To register the XR experience, the XR computing platform 102 may store the XR experience information, along with a unique identifier for the XR experience, in a data structure 110 for later access, modification, and/or information retrieval.

As shown in FIG. 1B and by reference number 112, the XR computing platform 102 may obtain a first model 114 for use in determining an access network to use for the XR experience. The XR computing platform 102 may obtain the first model 114 by generating the first model 114. For example, the XR computing platform 102 may train the first model 114 using historical information, such as historical information regarding one or more XR experiences (also referred to herein as XR experience parameters) (e.g., a type of a particular XR experience of the one or more XR experiences, content information of the particular XR experience, a threshold user device characteristic to activate the particular XR experience, an optimal user device characteristic to activate the particular XR experience, a threshold access network characteristic to activate the particular XR experience, an optimal access network characteristics to activate the particular XR experience, performance information of the particular XR experience, and/or the like); historical information regarding a plurality of access networks used to deliver the one or more XR experiences (also referred to herein as access network parameters) (e.g., a type of a particular access network of the plurality of access networks, a download speed of the particular access network, an upload speed of the particular access network, a latency of the particular access network, an availability of the particular access network, a congestion of the particular access network, and/or the like); historical information regarding a plurality of user devices to which the one or more XR experiences were delivered (also referred to herein as user device parameters) (e.g., a type of a particular user device of the plurality of user devices, a capability of the particular user device, a location of the particular user device, a velocity of the particular user device, and/or the like); and/or the like.

In some implementations, when generating the first model 114, the XR computing platform may perform a data preprocessing operation. For example, the XR computing platform 102 may preprocess the historical information to remove non-ASCII characters, white spaces, confidential data, and/or the like. In this way, the XR computing platform 102 may organize thousands, millions, or billions of data items for machine learning and model generation.

In some implementations, the XR computing platform 102 may perform a training operation when generating the first model 114. For example, the XR computing platform 102 may portion the historical information into a training set (e.g., a set of information to train the first model 114), a validation set (e.g., a set of information used to evaluate a fit of the first model 114 and/or to fine tune the first model 114), a test set (e.g., a set of information used to evaluate a final fit of the first model 114), and/or the like. In some implementations, the XR computing platform 102 may preprocess and/or perform dimensionality reduction to reduce the historical information to a minimum feature set. In some implementations, the XR computing platform 102 may train the first model 114 on this minimum feature set, thereby reducing processing to train the first model 114, and may apply a classification technique, to the minimum feature set.

In some implementations, the XR computing platform 102 may use a classification technique, such as a logistic regression classification technique, a random forest classification technique, a gradient boosting machine learning (GBM) technique, and/or the like, to determine a score (e.g., a probability that a particular access network is capable of delivering an XR experience at the optimal level, and/or the like). Additionally, or alternatively, the XR computing platform 102 may use a naïve Bayesian classifier technique. In this case, the XR computing platform 102 may perform binary recursive partitioning to split the historical information of the minimum feature set into partitions and/or branches and use the partitions and/or branches to perform predictions (e.g., that the particular access network will deliver the XR experience at the optimal level). Based on using recursive partitioning, the XR computing platform 102 may reduce utilization of computing resources relative to manual, linear sorting and analysis of data items, thereby enabling use of thousands, millions, or billions of data items to train the first model 114, which may result in a more accurate model than using fewer data items.

Additionally, or alternatively, the XR computing platform 102 may train the first model 114 using a supervised training procedure that includes receiving input to the first model 114 from a subject matter expert, which may reduce an amount of time, an amount of processing resources, and/or the like to train the first model 114 relative to an unsupervised training procedure. In some implementations, the XR computing platform 102 may use one or more other model training techniques, such as a neural network technique, a latent semantic indexing technique, and/or the like. For example, the XR computing platform 102 may perform an artificial neural network processing technique (e.g., using a two-layer feedforward neural network architecture, a three-layer feedforward neural network architecture, and/or the like) to perform pattern recognition with regard to patterns of whether certain access networks were successful or not successful in optimizing the XR experience. In this case, using the artificial neural network processing technique may improve an accuracy of the first model 114 by being more robust to noisy, imprecise, or incomplete data, and by enabling the XR computing platform 102 to detect patterns and/or trends undetectable to human analysts or systems using less complex techniques.

In some implementations, after training the first model 114, the XR computing platform 102 may store the first model 114 in a repository of machine learning models 116. The XR computing platform may later obtain the first model 114, as shown by reference number 112, by selecting the first model 114 from the repository of machine learning models 116. The XR computing platform 102 may select the first model 114 based on a degree of similarity of the XR experience information of the XR experience to the XR experience parameters that were used to train the first model 114.

In some implementations, another device, such as a server device, may train the first model 114. The XR computing platform 102 may later obtain the first model 114 from the other device. The other device may update and send (e.g., on a scheduled basis, on an on-demand basis, on a triggered basis, on a periodic basis, and/or the like) the first model 114 to the XR computing platform 102.

In some implementations, after the other device trains the first model 114, the other device may store the first model 114 in the repository of machine learning models 116. Similar to that described above, the XR computing platform 102 may obtain the first model 114, as shown by reference number 112, by selecting the first model 114 from the repository of machine learning models 116. The XR computing platform 102 may select the first model 114 based on a degree of similarity of the XR experience information of the XR experience to the XR experience parameters that were used to train the first model 114.

As shown in FIG. 1B and by reference number 118, the XR computing platform 102 may obtain a second model 120 for use in determining a manner in which to execute the XR experience. Similar to that described above, the XR computing platform 102 may obtain the second model 120 by training the second model 120, by selecting the second model 120 from the repository of machine learning models 116, by obtaining the second model 120 from another device that trained the second model 120, and/or the like.

In some implementations, the XR computing platform 102 may obtain a third model for use in determining content for the XR experience. Similar to that described above, the XR computing platform 102 may obtain the third model by training the third model, by selecting the third model from the repository of machine learning models 116, by obtaining the third model from another device that trained the third model, and/or the like.

After obtaining the first model 114 and the second model 120, the XR computing platform 102 may assign the first model 114 and the second model 120 to the XR experience, as shown by reference number 122. To assign the first model 114 and the second model 120 to the XR experience, the XR computing platform 102 may store information identifying the first model 114 and the second model 120 in the data structure 110. Additionally, or alternatively, the XR computing platform 102 may indicate that the first model 114 and the second model 120 are to be used for communications associated with the XR experience.

Figure 1C:
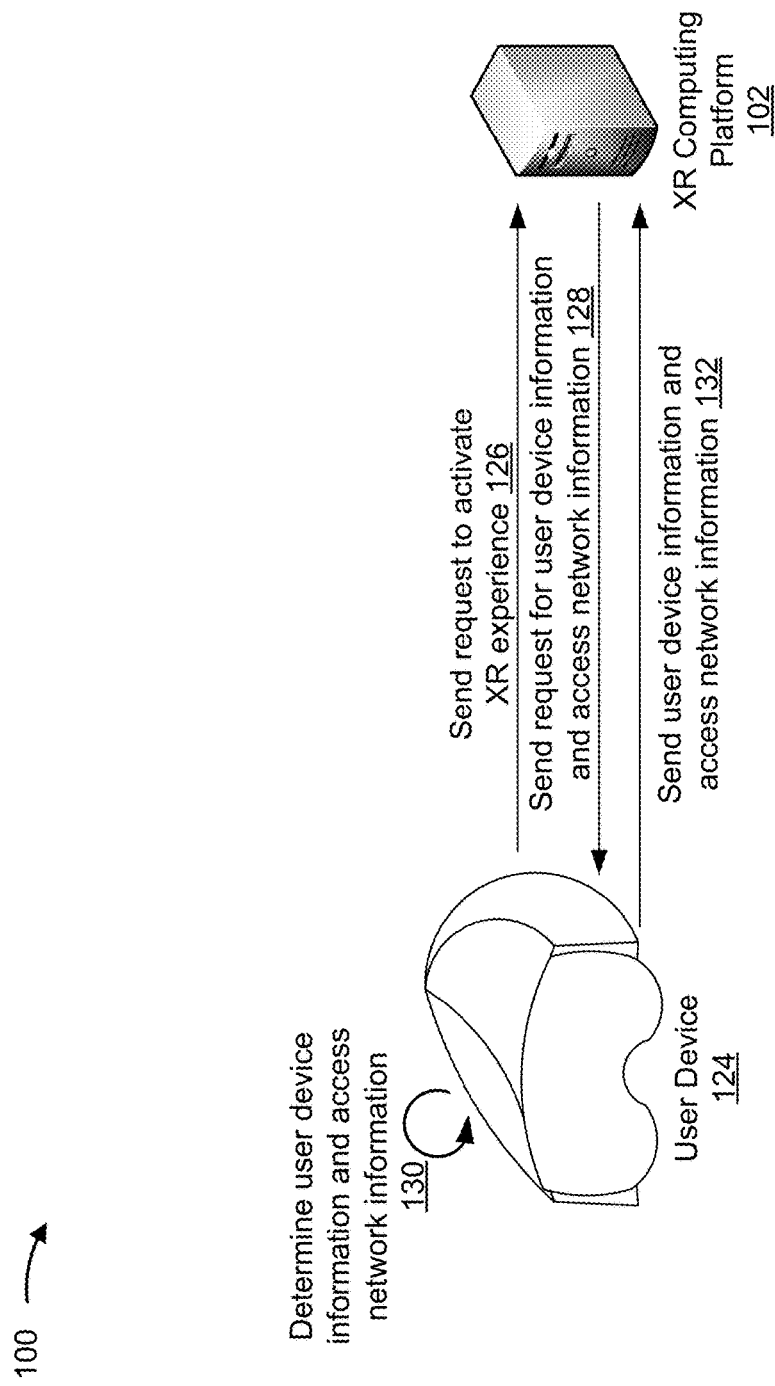

In FIG. 1C, assume that a user device 124 is one of the one or more user devices to which the content provider 104 made available the XR experience. As shown by reference number 126, the user device 124 may send a request to activate the XR experience to the XR computing platform 102. For example, a user of the user device 124 may wish to access the XR experience and may provide input to the user device 124 to instruct the user device 124 to send the request to activate the XR experience to the XR computing platform 102. The user device 124 may send the request via one or more packets.

In response to receiving the request, the XR computing platform 102 may send, via one or more packets, a request for user device information and access network information, as shown by reference number 128. In some implementations, the user device 124 may send the user device information and the access network information to the XR computing platform 102 with the request to activate the XR experience and/or without receiving a request for the user device information and the access network information from the XR computing platform 102. This may conserve computing and network resources that would otherwise be used by the XR computing platform 102 to generate and send the request and by the user device 124 to receive and respond to the request.

The user device information may relate to the user device 124. For example, the user device information may include a type of the user device 124 (e.g., a 5G compatible smartphone, and/or the like), a capability of the user device 124 (e.g., processing capability, memory capability, power capability, communication capability, and/or the like), a location of the user device 124 (e.g., geographic coordinates such as latitude and longitude, a cell identifier, a distance from a network device, and/or the like), a velocity of the user device, and/or the like.

The access network information may relate to a set of access networks available to the user device 124. For example, the access network information may include, with respect to a particular access network of the set of access networks, a type of the particular access network (e.g., a 3G network, a 4G network, a 5G network, a Wi-Fi network, and/or the like), a download speed of the particular access network (e.g., about 15 Mbps, and/or the like), an upload speed of the particular access network (e.g., about 10 Mbps, and/or the like), a latency of the particular access network (about 40 ms, and/or the like), an availability of the particular access network, a congestion of the particular access network, and/or the like.

As shown by reference number 130, the user device 124 may determine the user device information and the access network information by compiling information from one or more memories and/or by communicating with one or more network devices (e.g., one or more base stations, and/or the like). The user device 124 may send the user device information and the access network information to the XR computing platform 102, as shown by reference number 132. The user device 124 may send the user device information and the access network information via one or more packets.

Figure 1D:
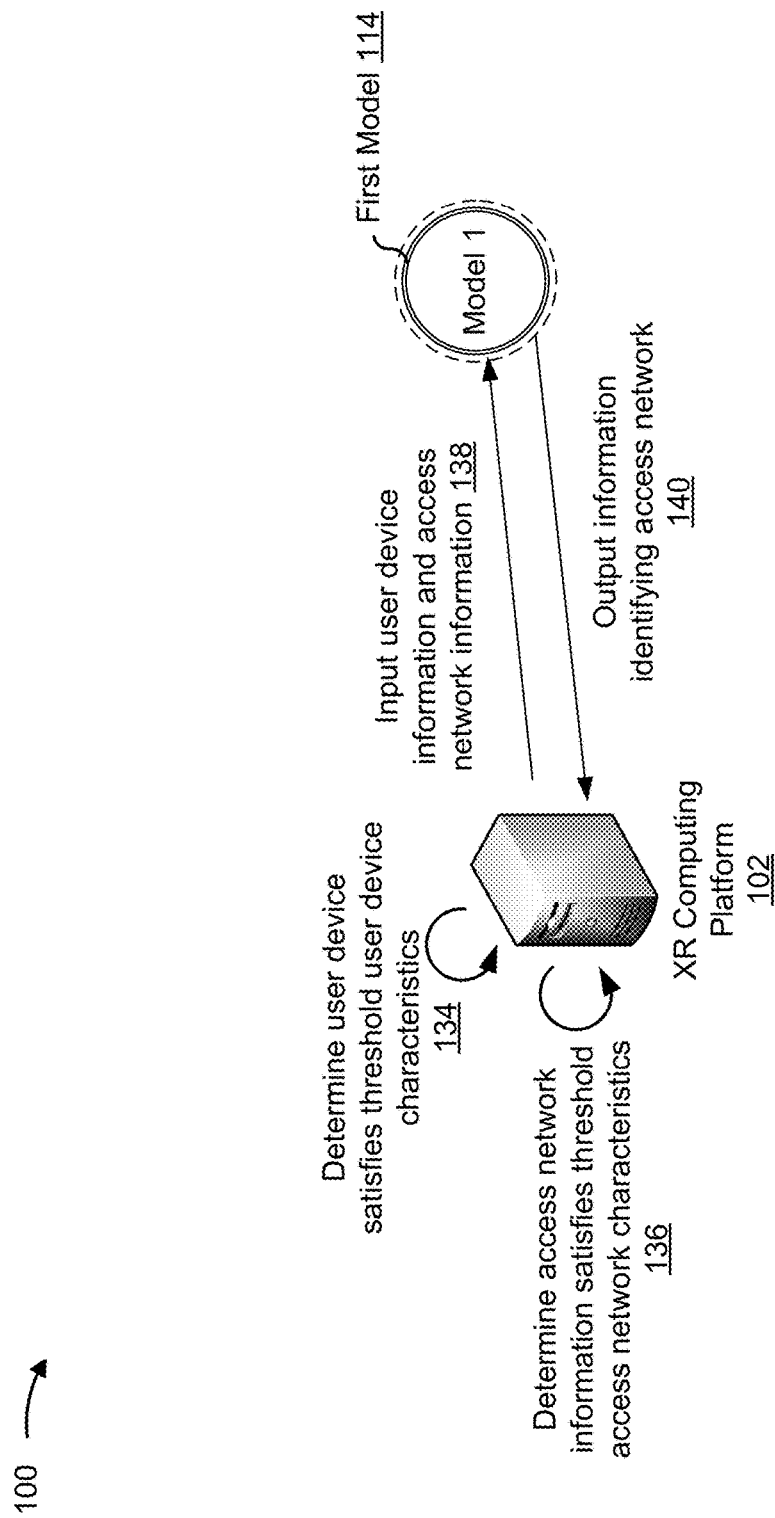

As shown in FIG. 1D and by reference number 134, the XR computing platform 102 may determine whether the user device information satisfies the one or more threshold user device characteristics to allow activation of the XR experience. For example, the XR computing platform 102 may compare the user device information and the one or more threshold user device characteristics stored in a memory. In some implementations, if the user device information satisfies all of the one or more threshold user device characteristics, then the XR computing platform 102 may determine that the user device 124 is permitted to activate the XR experience. In some implementations, if the user device information satisfies at least one, or a particular subset, of the one or more threshold user device characteristics, then the XR computing platform 102 may determine that the user device 124 is permitted to activate the XR experience. In this case, the XR computing platform 102 may generate a similarity score (also referred to herein as a user device similarity score) based on a result of comparing the user device information and the one or more threshold user device characteristics, where the similarity score may represent a weighted measure of similarity between the user device information and the one or more threshold user device characteristics. The XR computing platform 102 may determine that the user device 124 is permitted to activate the XR experience when the similarity score satisfies a threshold (also referred to herein as a user device similarity score threshold).

In some implementations, some user devices may be given priority over other user devices in activating the XR experience. For example, user devices used in emergency services may be assessed relative to one or more different threshold user device characteristics (e.g., more basic threshold user device characteristics) and/or a lower user device similarity score threshold. Thus, the user devices used in emergency services may be permitted to activate the XR experience while other user devices having similar properties may not be.

As shown by reference number 136, the XR computing platform 102 may determine whether the access network information satisfies the one or more threshold access network characteristics. For example, the XR computing platform 102 may compare the access network information and the one or more threshold access network characteristics stored in a memory. In some implementations, if the access network information satisfies all of the one or more threshold access network characteristics, then the XR computing platform 102 may determine that the user device 124 is permitted to activate the XR experience. In some implementations, if the access network information satisfies at least one, or a particular subset, of the one or more threshold access network characteristics, then the XR computing platform 102 may determine that the user device 124 is permitted to activate the XR experience. In this case, the XR computing platform 102 may generate a similarity score (also referred to herein as an access network similarity score) based on a result of comparing the access network information and the one or more threshold access network characteristics, where the similarity score may represent a weighted measure of similarity between the access network information and the one or more threshold access network characteristics. The XR computing platform 102 may determine that the user device 124 is permitted to activate the XR experience when the similarity score satisfies a threshold (also referred to herein as an access network similarity score threshold).

In some implementations, in order to determine whether to permit the user device 124 to activate the XR experience, the XR computing platform 102 may consider a combination of a result of determining whether the user device information satisfies the one or more threshold user device characteristics, as shown by reference number 134, and a result of determining whether the access network information satisfies the one or more threshold access network characteristics, a shown by reference number 136. For example, the XR computing platform 102 may determine that the user device 124 is permitted to activate the XR experience only if the user device information satisfies all of the one or more threshold user device characteristics and the access network information satisfies all of the one or more threshold access network characteristics. As another example, the XR computing platform 102 may determine that the user device 124 is permitted to activate the XR experience only if the user device similarity score satisfies the user device similarity score threshold and the access network similarity score satisfies the access network similarity score threshold. As another example, the XR computing platform 102 may determine that the user device 124 is permitted to activate the XR experience only if a combination (e.g., sum, weighted combination, and/or the like) of the user device similarity score and the access network similarity score satisfies a threshold.

When the XR computing platform 102 determines that the user device 124 is permitted to activate the XR experience, the XR computing platform 102 may determine an access network, of the set of access networks, that the user device 124 is to use for the XR experience. For example, the XR computing platform 102 may use the first model 114 (described in connection with FIG. 1B) to determine an access network that the user device 124 is to use for the XR experience.

As shown by reference number 138, the XR computing platform 102 may input the user device information and the access network information into the first model 114. Based on the user device information and the access network information, the first model 114 may output information identifying the access network, as shown by reference number 140. The information identifying the access network may include a respective score for each access network of the set of access networks. The score, for a particular access network of the set of access networks, may represent a probability that the particular access network will deliver the XR experience at the optimal level. The XR computing platform 102 may select the access network as the access network with the highest score or with a score that satisfies a threshold.

In some implementations, if the first model 114 outputs information identifying a particular access network that is different from a current access network being used by the user device 124 (e.g., requiring a drop from a 4G network to a 3G network, and/or the like), the XR computing platform 102 may re-send, one or more times, the request for access network information (e.g., as shown by reference number 128 in FIG. 1C). In response, the user device 124 may re-compile the access network information and may re-send the access network information to the XR computing platform 102 for re-evaluation.

Figure 1E:
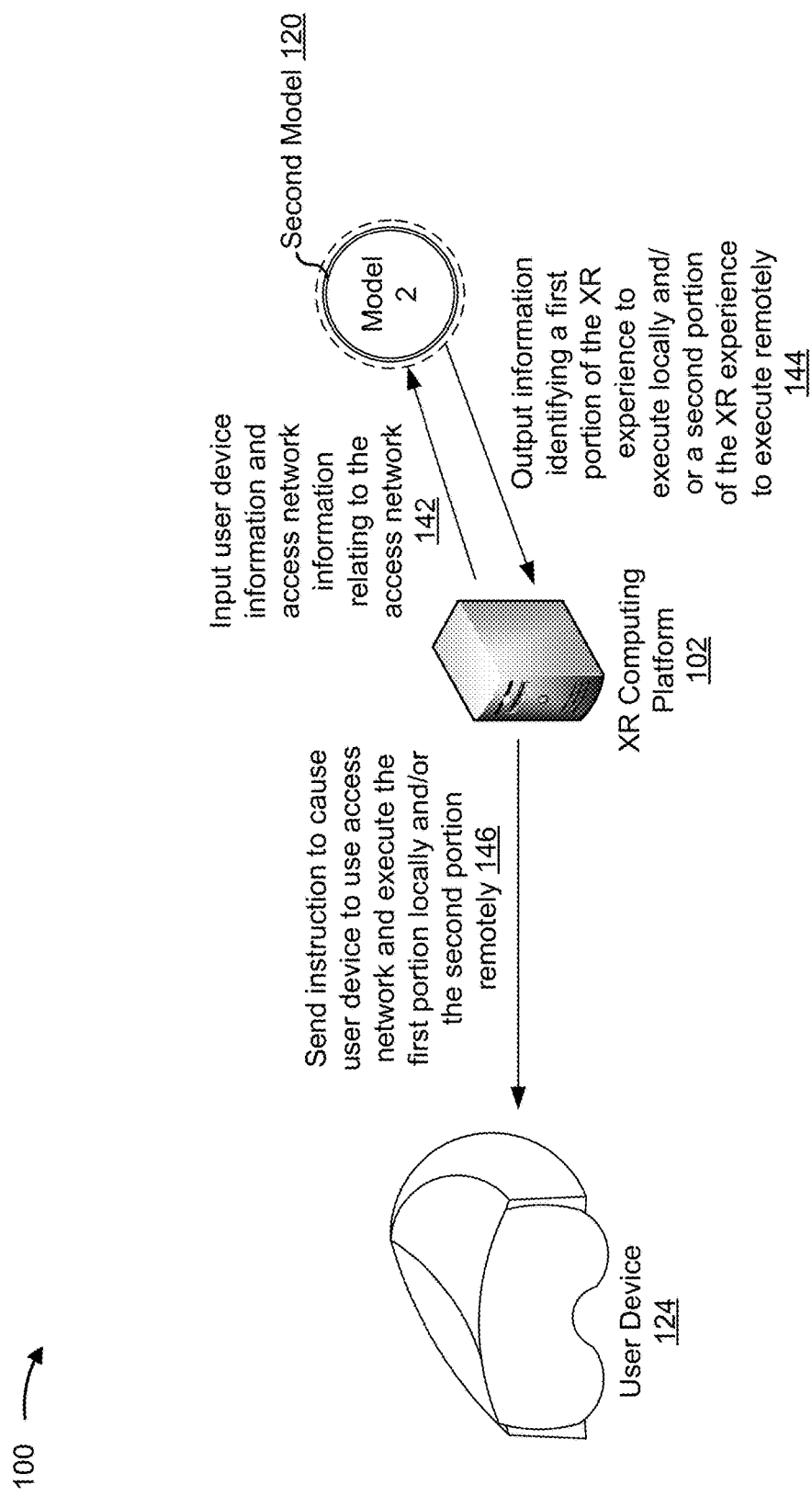

As shown in FIG. 1E, after the XR computing platform 102 selects the access network that the user device 124 is to use for the XR experience, the XR computing platform 102 may determine a manner in which to execute the XR experience. For example, the XR computing platform 102 may use the second model 120 (described in connection with FIG. 1B) to determine a first portion of the XR experience to execute locally at the user device 124 and/or a second portion of the XR experience to execute remotely from the user device 124. Accordingly, as shown by reference number 142, the XR computing platform 102 may input the user device information and a subset of the access network information relating to the access network to the second model 120. Based on the user device information and the subset of the access network information relating to the access network, the second model 120 may output information relating to a manner in which to execute the XR experience, such as information identifying a first portion of the XR experience to execute locally at the user device 124 and/or a second portion of the XR experience to execute remotely from the user device 124.

As shown by reference number 144, the second model 120 may output information identifying the first portion of the XR experience to execute locally at the user device 124 and/or the second portion of the XR experience to execute remotely from the user device 124. The information identifying the first portion and/or the second portion may include a respective score for each manner of executing the XR experience. The score, for a particular manner of executing the XR experience, may represent a probability that the particular manner of execution will result in the XR experience performing at the optimal level. The XR computing platform 102 may select the first portion and/or the second portion based on the scores.

In some implementations, the XR computing platform 102 may determine, based on the output from the second model 120, that the first portion comprises an entirety of the XR experience, and the second portion comprises none of the XR experience. In this case, the XR computing platform 102 may determine that the entirety of the XR experience is to execute locally at the user device 124. For example, based on the access network corresponding to a 4G network, the second model 120 may determine that local execution of the XR experience has the greatest probability of resulting in a performance at the optimal level.

In some implementations, the XR computing platform 102 may determine, based on the output from the second model 120, that the second portion comprises an entirety of the XR experience, and the first portion comprises none of the XR experience. In this case, the XR computing platform 102 may determine that the entirety of the XR experience is to execute remotely from the user device 124. Additionally, or alternatively, the XR computing platform 102 may determine that the entirety of the XR experience is to execute via a cloud computing platform (e.g., a hybrid cloud computing platform, a private cloud computing platform, and/or the like), a distributed computing platform, and/or the like. For example, based on the access network corresponding to a 5G network, the second model 120 may determine that remote, distributed execution of the XR experience has the greatest probability of resulting in a performance at the optimal level.

In some implementations, the XR computing platform 102 may determine, based on the output from the second model 120, that a combination of the first portion and the second portion comprises an entirety of the XR experience. In this case, the XR computing platform 102 may determine that the first portion of the XR experience is to execute locally at the user device 124, and the second portion of the XR experience is to execute remotely from the user device 124. The first portion executing locally and the second portion executing remotely may mean that certain functionality of the XR experience is to execute on the user device 124 and certain functionality of the XR experience is to execute on a device other than the user device 124, such as on a cloud computing platform (e.g., a hybrid cloud computing platform, a private cloud computing platform, and/or the like), a distributed computing platform, and/or the like.

In some implementations, the XR computing platform 102 may determine content for the XR experience. There may be a plurality of versions of content for the XR experience and some of the plurality of versions may be better suited for certain user devices and/or certain access networks. The plurality of versions of content may be stored in a data structure along with corresponding user device characteristics and/or access network characteristics. The XR computing platform 102 may use the third model (described in connection with FIG. 1B) to determine content for the XR experience. The XR computing platform 102 may input the user device information and the access network information to the third model. Based on the user device information and the access network information, the third model may output information identifying content for the XR experience to present (e.g., reduced-functionality content, full-functionality content, and/or the like). The information identifying the content may include a respective score for version of content for the XR experience. The score, for a particular version of content of a plurality of versions of content, may represent a probability that the particular version of content will result in the XR experience performing at the optimal level. The XR computing platform 102 may select the version of content as the version of content with the highest score or with a score that satisfies a threshold.

As shown by reference number 146, the XR computing platform 102 may send, via one or more packets, an instruction to cause the user device 124 to use the access network for the XR experience and execute the first portion locally and/or the second portion remotely. Similar to that stated above, the instruction may indicate that the second portion is to be executed via a cloud computing platform (e.g., a hybrid cloud computing platform, a private cloud computing platform, and/or the like), a distributed computing platform, and/or the like.

Figure 1F:
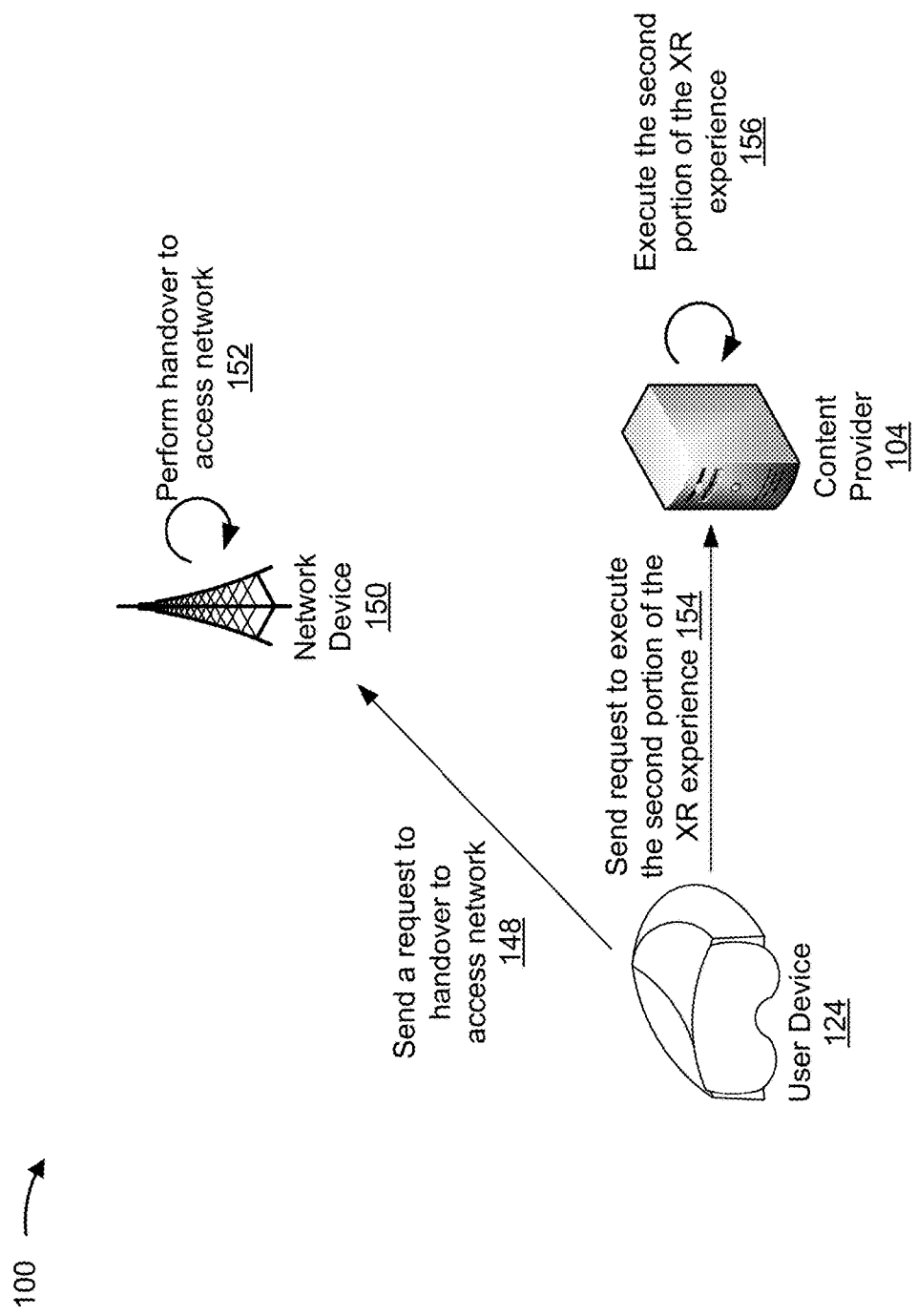

In FIG. 1F, assume that the access network is a different access network from a current access network being used by the user device 124. The user device 124, as shown by reference number 148, may send a request, via one or more packets, to handover to the access network. As shown by reference number 152, a network device 150 (e.g., a base station, a network controller, a router, an access point, a gateway, and/or the like) may, along with one or more other network devices (e.g., one or more other base stations, one or more other network controllers, one or more other routers, one or more other access points, one or more other gateways, and/or the like), perform a handover to the access network (e.g., from a 4G network to a 5G network, from a 3G network to a Wi-Fi network, and/or the like). Additionally, or alternatively, the XR computing platform 102 may communicate with the network device 150 to initiate the handover to the access network.

In FIG. 1F, assume further that the XR computing platform 102 determined, based on the output shown by reference number 144, that the second portion comprises the entirety of the XR experience. The user device 124, as shown by reference number 154, may send, via one or more packets, a request to execute the second portion of the XR experience to the content provider 104. As shown by reference number 156, the content provider 104 may execute the second portion of the XR experience using a cloud computing platform (e.g., a hybrid cloud computing platform, a private cloud computing platform, and/or the like), a distributing computing platform, and/or the like. Thus, the user device 124 may execute the XR experience and deliver functionality of the XR experience to the user of the user device 124.

Figure 1G:
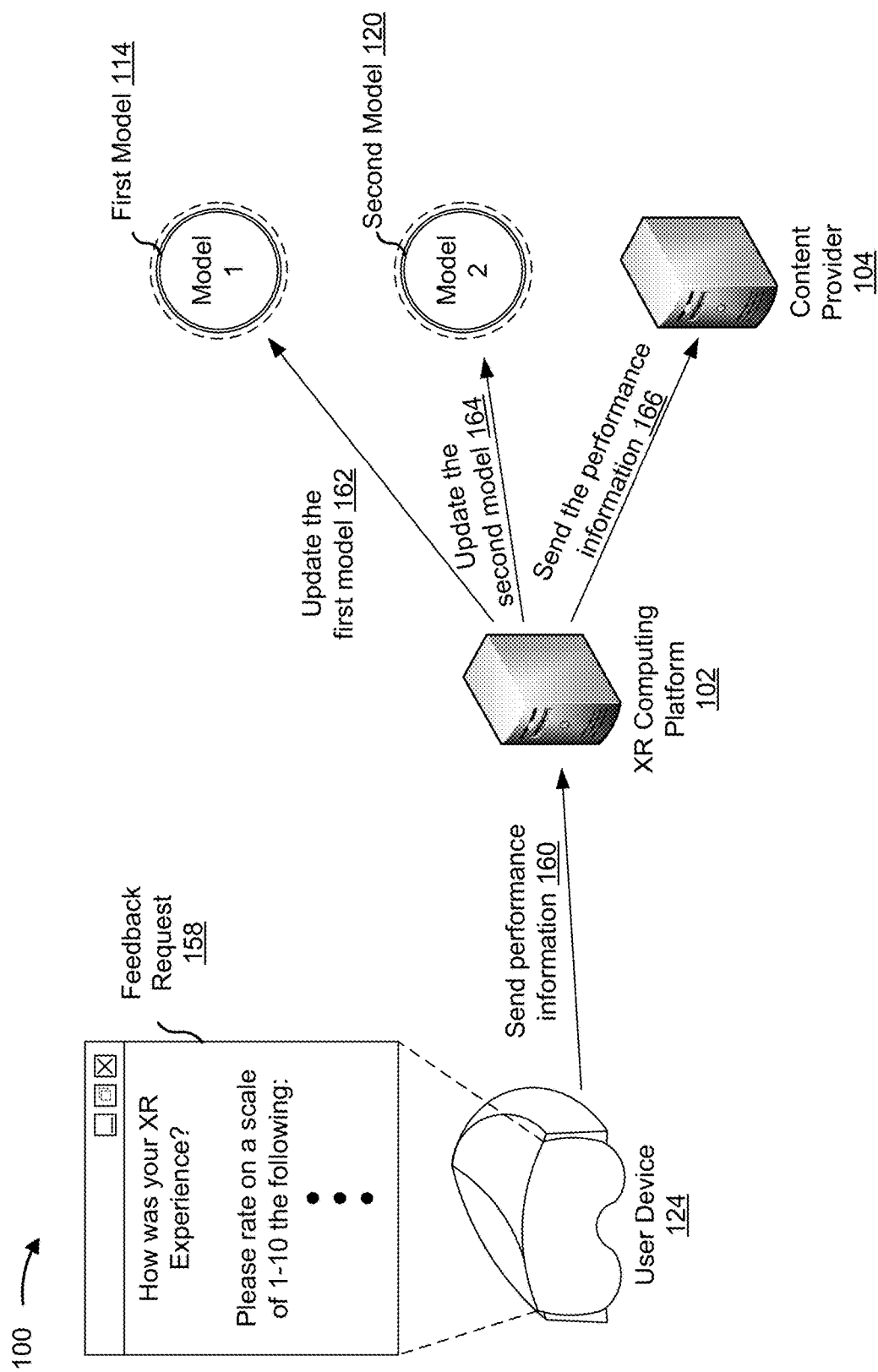

As shown in FIG. 1G, the user device 124, after or during execution of the XR experience, may receive a feedback request 158 from the content provider 104. For example, the feedback request 158 may invite the user of the user device 124 to provide performance information relating to the XR experience. For example, the user may provide the performance information by rating and/or describing performance aspects of the XR experience (e.g., responsiveness, resolution, and/or the like). The user may input the performance information into the user device 124 (e.g., via a keyboard, via a microphone, and/or the like). Additionally, or alternatively, the user may use a different user device to input the performance information.

Additionally, or alternatively, the user device 124 may determine, after or during execution of the XR experience and without user input, the performance information, or a subset of the performance information, relating to the XR experience. For example, the user device 124 may determine, using one or more sensors, one or more processors, and/or the like, performance aspects of the XR experience. For example, the user device 124 may determine whether the user device 124 experienced lag, whether the user device 124 failed to meet a display threshold resolution, and/or the like.

As shown by reference number 160, the user device 124 and/or the different user device may send the performance information to the XR computing platform 102 via one or more packets. Based on the performance information, the XR computing platform 102 may update the first model 114, as shown by reference number 162, update the second model 120, as shown by reference number 164, and/or update the third model. To update the first model 114, the second model 120, and/or the third model, the XR computing platform 102 may retrain the first model 114, the second model 120, and/or the third model using the performance information as additional training data. By updating the first model 114, the second model 120, and/or the third model, the XR computing platform 102 may improve an accuracy of the first model 114, the second model 120, and/or the third model. By using more accurate models, the XR computing platform 102 may conserve computing and/or network resources that would otherwise be wasted using less accurate models and delivering the XR experience at a sub-optimal level.

Additionally, or alternatively, as shown by reference number 166, the XR computing platform 102 may send, via one or more packets, the performance information to the content provider 104. The XR computing platform 102 may send the performance information to the content provider 104 on a scheduled basis, on an on-demand basis, on a triggered basis, on a periodic basis, and/or the like. In some implementations, the content provider 104 may obtain input information (e.g., the access network information, the user device information, and/or the like), and/or output information (e.g., information identifying a particular access network, information identifying a manner in which to execute a particular XR experience, information identifying content for the particular XR experience, and/or the like) from the machine learning model repository 116 (e.g., on a scheduled basis, on an on-demand basis, on a triggered basis, on a periodic basis, and/or the like). Based on the performance information, the input information, and/or the output information, the content provider 104 may optimize content of the XR experience, modify the XR experience information, create different XR experiences, and/or the like.

It has been described that the XR computing platform 102 performs a number of operations to optimize an XR experience. For example, as described in connection with FIGS. 1D-1E, the XR computing platform 102 may determine whether the user device information and/or the access network information satisfies one or more threshold characteristics of the XR experience, may determine an access network to deliver the XR experience (e.g., a 4G network, a 5G network, a Wi-Fi network, and/or the like), and may determine a manner in which to execute the XR experience (e.g., entirely local execution, partially local execution and partially remote execution, via a distributed computing platform, via a cloud computing platform, and/or the like).

However, in practice, the user device 124, or another device, may perform one or more or all of these operations. For example, the user device 124, or another device, may determine whether the user device information and/or the access network information satisfies one or more threshold characteristics of the XR experience, may determine an access network to deliver the XR experience (e.g., a 4G network, a 5G network, a Wi-Fi network, and/or the like), may determine a manner in which to execute the XR experience (e.g., entirely local execution, partially local execution and partially remote execution, via a distributed computing platform, via a cloud computing platform, and/or the like), and/or the like.

It has been described that the content provider 104 performs a number of operations relating to an XR experience. For example, as described in connection with FIGS. 1A and 1G, the content provider 104 may make the XR experience available to one or more user devices and may execute a portion or an entirety of the XR experience. However, in practice, the XR computing platform 102, or another device, may perform one or more or all of these operations. For example, the XR computing platform 102 may make the XR experience available to the one or more user devices, may execute a portion or an entirety of the XR experience, and/or the like.

As indicated above, FIGS. 1A-1G are provided merely as examples. Other examples are possible and may differ from what is described with regards to FIGS. 1A-1G. The number and arrangement of devices and networks shown in FIGS. 1A-1G are provided as one or more examples. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2A:
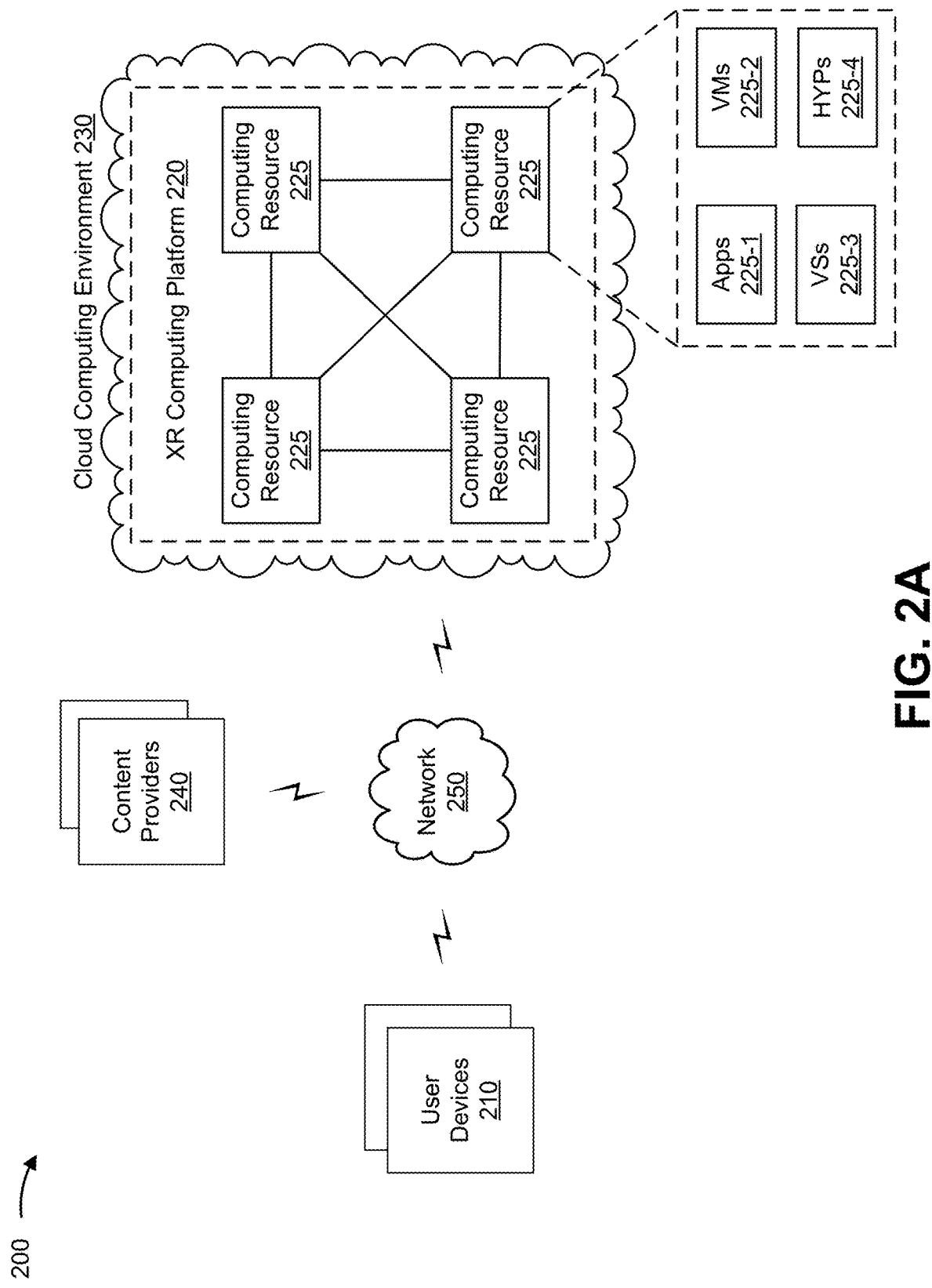
FIGS. 2A-2C are diagrams of an example environment in which systems and/or methods described herein may be implemented.
Figure 2C:
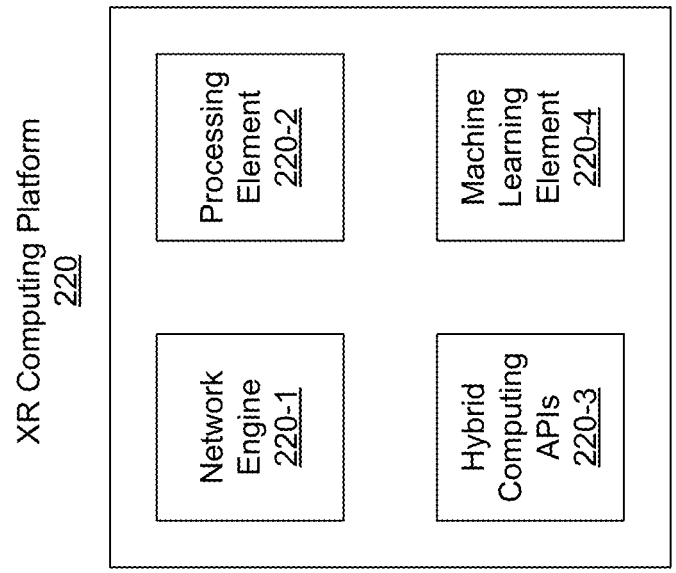
Figure 2B:
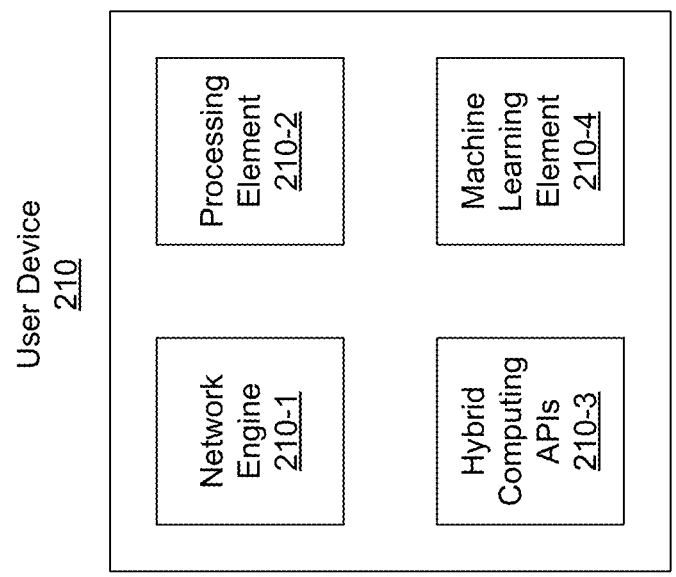

FIGS. 2A-2C are diagrams of one or more example environments 200 in which systems and/or methods, described herein, may be implemented. As shown in FIG. 2A, environment 200 may include one or more user devices 210, an XR computing platform 220 hosted within a cloud computing environment 230, and one or more content providers 240. Devices of environment 200 may interconnect via wired connections, wireless connections, or a combination of wired and wireless connections.

User device 210 includes one or more devices capable of receiving, generating, storing, processing, and/or providing information relating to one or more XR experiences, and/or executing the one or more XR experiences. For example, user device 210 may include a computer (e.g., a desktop computer, a laptop computer, a tablet computer, a handheld computer, a server device, etc.), a mobile phone (e.g., a smart phone, a radiotelephone, etc.), a wearable device (e.g., a headset, glasses, a head-mounted display, etc.), an internet of things (IoT) device or smart appliance, or a similar device. In some implementations, user device 210 may communicate with XR computing platform 220 regarding one or more XR experiences. User device 210 may correspond to user device 124 as described with regard to FIGS. 1A-1G.

XR computing platform 220 includes one or more computing resources configured to determine an optimal manner in which to deliver and/or execute one or more XR experiences. For example, XR computing platform 220 may be a platform implemented by cloud computing environment 230 that may register the one or more XR experiences, obtain a model related to the one or more XR experiences, and use the model to determine the optimal manner in which to deliver and/or execute the one or more XR experiences. In some implementations, XR computing platform 220 may be implemented by computing resources 225 of cloud computing environment 230. XR computing platform 220 may correspond to XR computing platform 124 as described with regard to FIGS. 1A-1G.

XR computing platform 220 may include a server device or a group of server devices. In some implementations, XR computing platform 220 may be hosted in cloud computing environment 230. In some implementations, XR computing platform 220 may be non-cloud-based or may be partially cloud-based.

Cloud computing environment 230 includes an environment that delivers computing as a service, whereby shared resources, services, and/or the like may be provided to user devices 210, XR computing platform 220, and/or content providers 240. Cloud computing environment 230 may provide computation, software, data access, storage, and/or other services that do not require end-user knowledge of a physical location and configuration of a system and/or a device that delivers the services. As shown, cloud computing environment 230 may include XR computing platform 220 and computing resource 225.

Computing resource 225 includes one or more personal computers, workstation computers, server devices, or another type of computation and/or communication device. In some implementations, computing resource 225 may host XR computing platform 220. The cloud resources may include compute instances executing in computing resource 225, storage devices provided in computing resource 225, data transfer devices provided by computing resource 225, and/or the like. In some implementations, computing resource 225 may communicate with other computing resources 225 via wired connections, wireless connections, or a combination of wired and wireless connections.

As further shown in FIG. 2A, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with XR computing platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system. A process virtual machine may execute a single program and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the "guest operating systems" and may manage the execution of the guest operating systems. Multiple instances of a variety of operating systems may share virtualized hardware resources.

Content provider 240 includes one or more devices capable of creating one or more XR experiences, providing the one or more XR experiences, executing the one or more XR experiences, receiving and/or transmitting information relating to the one or more XR experiences, and/or modifying content of the one or more XR experiences. For example, content provider 240 may include one or more server devices, one or more computation and/or communication devices, one or more cloud computing devices, one or more device of a data center, and/or the like. In some implementations, content provider 240 may create one or more XR experiences and provide the one or more XR experiences to user device 210 and/or XR computing platform 220. Content provider 240 may correspond to content provider 104 as described with regard to FIGS. 1A-1G.

Network 250 includes one or more wired and/or wireless networks. For example, network 250 may include a cellular network (e.g., a long-term evolution (LTE) network, a code division multiple access (CDMA) network, a 3G network, a 4G network, a 5G network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud-computing network, and/or the like, and/or a combination of these or other types of networks. In some implementations, network 250 may use one or more network devices (e.g., one or more base stations, one or more network controllers, one or more routers, and/or the like) to enable communication between user device 210, XR computing platform 220, and/or content provider 240.

FIG. 2B is a diagram of example functional elements of user device 210. The example functional elements may be implemented in hardware, firmware, or a combination of software and hardware. As shown in FIG. 2B, the example functional elements of user device 210 may include network engine 210-1, processing element 210-2, hybrid computing application program interfaces ("APIs") 210-3, machine learning element 210-4, and/or the like. The functional elements of user device 210 may communicate via wired connections, wireless connections, and/or a combination of wired and wireless connections.

Network engine 210-1 is responsible for compiling and/or sending access network information and user device information. For example, as described above in connection with FIG. 1C, network engine 210-1 may monitor, collect, and/or send access network information (e.g., latency information, download speed information, and/or the like) relating to a set of access networks (e.g., a 4G network, a 5G network, a Wi-Fi network, and/or the like). As another example, network engine 210-1 may collect and/or send user device information (e.g., a type of the user device, a location of the user device, a capability of the user device, and/or the like).

Processing element 210-2 is responsible for making determinations based on comparisons between information and threshold characteristics. For example, as described about in connection with FIG. 1D, processing element 210-2 may determine that access network information (e.g., latency information, download speed information, upload speed information, and/or the like) satisfies one or more threshold access network characteristics to permit activation of an XR experience. As another example, processing element 210-2 may determine that user device information (e.g. a type of the user device, location of the user device, capability of the user device, a velocity of the user device, and/or the like) satisfies one or more user device threshold characteristics to permit activation of the XR experience.

Hybrid computing APIs 210-3 are responsible for assisting in the execution of an XR experience. For example, hybrid computing APIs 210-3 may include a rendering API, a graphics API, a spatial audio API, a computer vision API, and/or the like. In some implementations, hybrid computing APIs 210-3 may assist with executing the XR experience, as described in connection with FIG. 1F.

Machine learning element 210-4 is responsible for training, using, and/or storing a model to determine an optimal manner in which to deliver and/or execute one or more XR experiences. For example, as described in connection with FIG. 1B, machine learning element 210-4 may train, use, and/or store one or more models, such as the first model, the second model, and/or the third model. In some implementations, machine learning element 210-4 may update, or retrain, the one or more models.

FIG. 2C is a diagram of example functional elements of XR computing platform 220. The example functional elements may be implemented in hardware, firmware, or a combination of software and hardware. As shown in FIG. 2C, the example functional elements of XR computing platform 220 may include network engine 220-1, processing element 220-2, hybrid computing application program interfaces ("APIs") 220-3, and/or machine learning element 220-4. The functional elements of XR computing platform 220 may communicate via wired connections, wireless connections, and/or a combination of wired and wireless connections.

Network engine 220-1 operates on one or more computing resources and is responsible for receiving information and/or making determinations relating to access networks. For example, based on access network information (e.g., latency information, download speed information, and/or the like) and/or user device information (e.g., a type of a user device, a location of the user device, a capability of the user device, and/or the like), network engine 220-1 may determine an access network to deliver an XR experience.

Processing element 220-2 operates on one or more computing resources and is responsible for making processing determinations. For example, based on access network information (e.g., latency information, download speed information, and/or the like) and/or user device information (e.g., a type of a user device, a location of the user device, a capability of the user device, and/or the like), processing element 220-2 may determine a manner in which to execute an XR experience (e.g., determining a first portion to execute locally, determining a second portion to execute remotely, and/or the like).

Hybrid computing APIs 220-3 operate on one or more computing resources and are responsible for assisting in the execution of an XR experience. For example, hybrid computing APIs 220-3 may include a cloud rendering API, a graphics processing API, a spatial audio processing API, a computer vision API, and/or the like. In some implementations, hybrid computing APIs 220-3 may assist with executing the XR experience, as described in connection with FIG. 1F.

Machine learning element 220-4 operates on one or more computing resources and is responsible for training, using, and/or storing a model to determine an optimal manner in which to deliver and/or execute one or more XR experiences. For example, as described in connection with FIG. 1B, machine learning element 220-4 may train, use, and/or store one or more models, such as the first model, the second model, and/or the third model. In some implementations, machine learning element 220-4 may update, or retrain, the one or more models.

The number and arrangement of devices and networks shown in FIGS. 2A-2C are provided as one or more examples. In practice, there may be additional devices and/or networks, fewer devices and/or networks, different devices and/or networks, or differently arranged devices and/or networks than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) of environment 200 may perform one or more functions described as being performed by another set of devices of environment 200.

Figure 3:
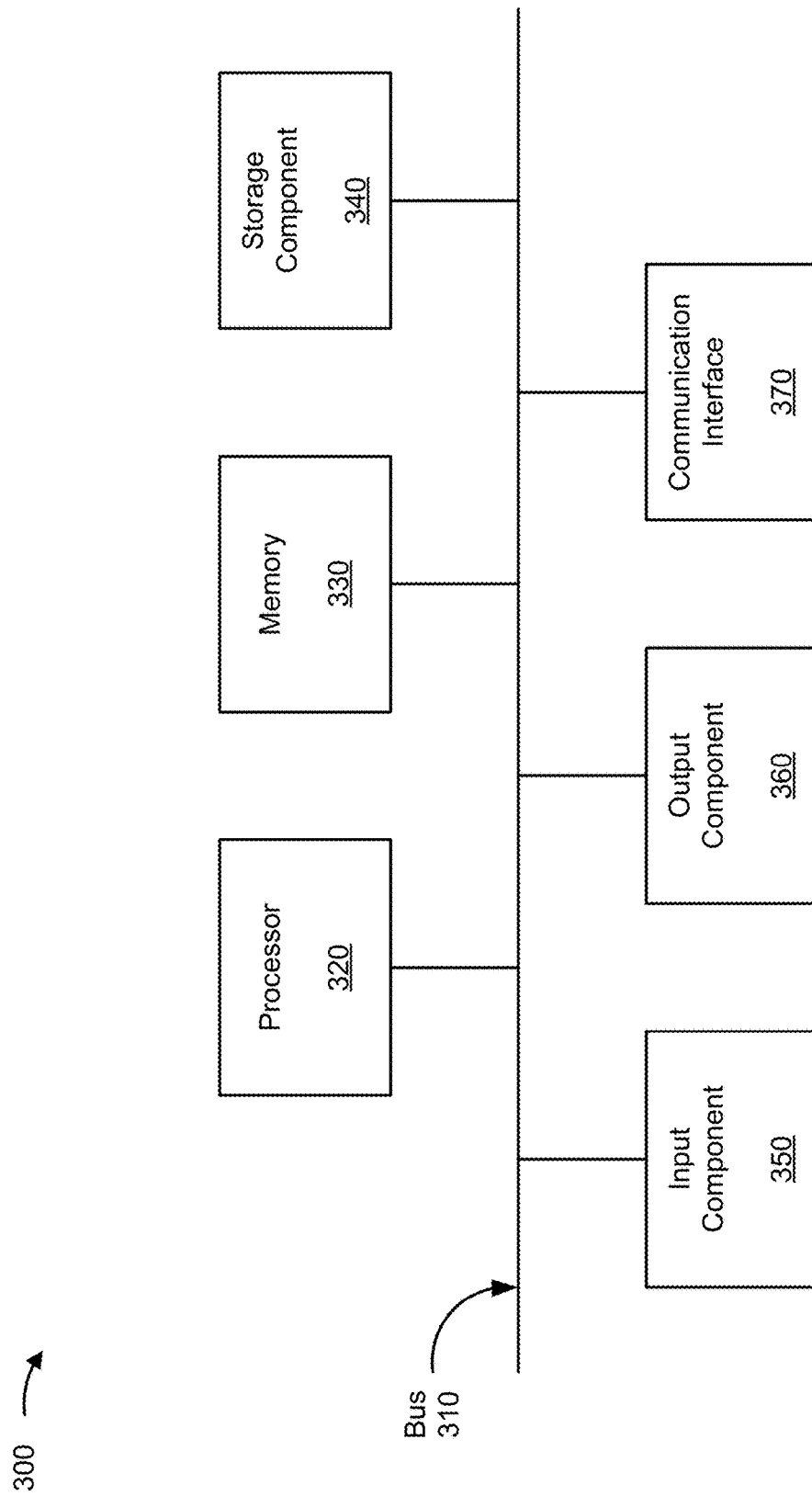
FIG. 3 is a diagram of example components of one or more devices of FIGS. 2A-2C.

FIG. 3 is a diagram of example components of a device 300. Device 300 may correspond to user device 210, XR computing platform 220, computing resource 225, and/or content provider 240. In some implementations, user device 210, XR computing platform 220, computing resource 225, and/or content provider 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
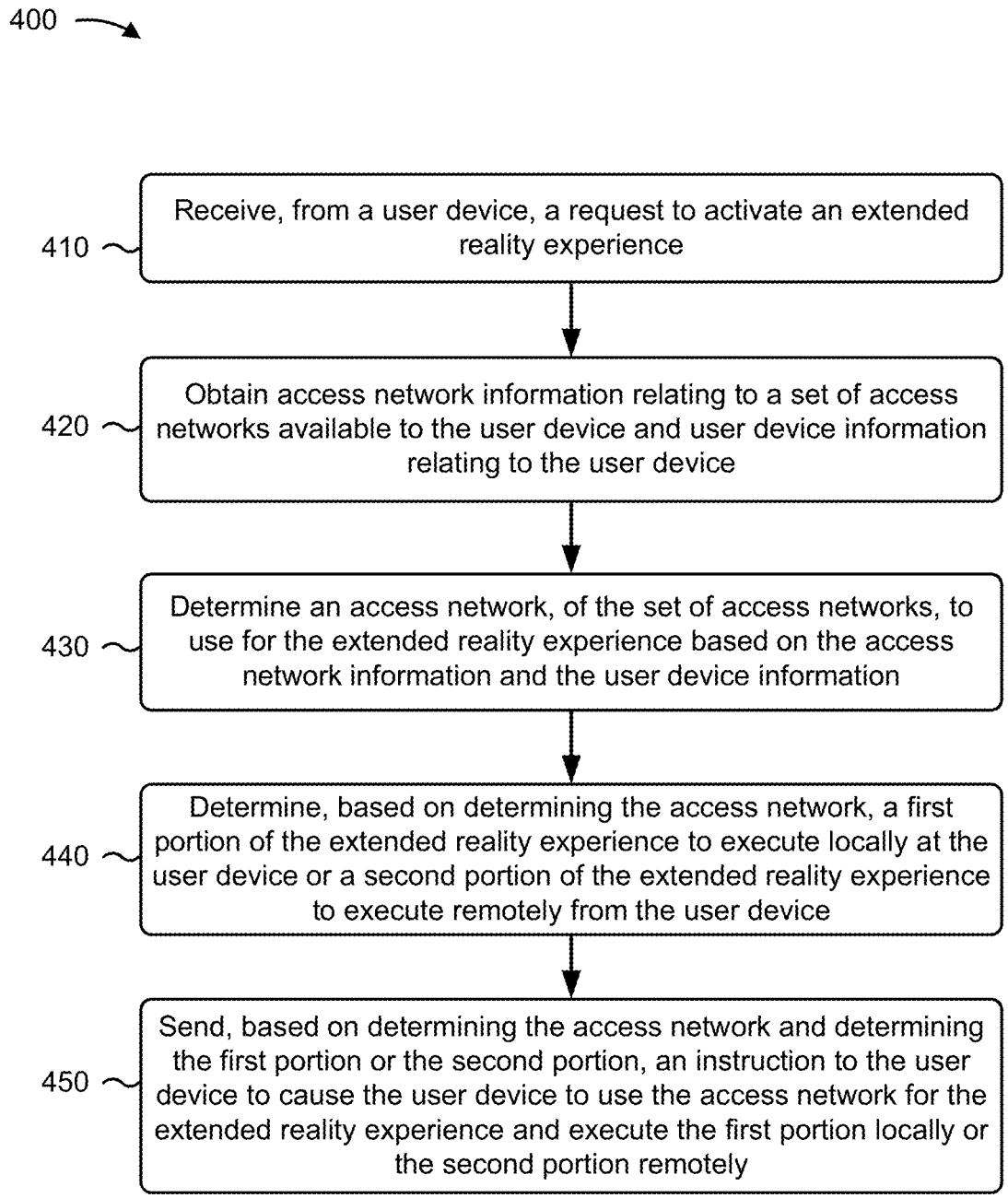
FIG. 4 is a flow chart of an example process for determining an optimal manner in which to deliver and/or execute an XR experience.

FIG. 4 is a flow chart of an example process 400 for determining an optimal manner in which to deliver and/or execute an XR experience. In some implementations, one or more process blocks of FIG. 4 may be performed by a device (e.g., XR computing platform 102, XR computing platform 220, and/or the like). In some implementations, one or more process blocks of FIG. 4 may be performed by another device or a group of devices separate from or including the device, such as user device (e.g., user device 124, user device 210, and/or the like) and/or content provider (e.g., content provider 240, and/or the like).

As shown in FIG. 4, process 400 may include receiving a request to activate an extended reality experience (block 410). For example, the device (e.g., using computing resource 225, processor 320, memory 330, storage component 340, input component 350, output component 360, communication interface 370 and/or the like) may receive a request to activate an extended reality experience, as described above. In some implementations, the request includes extended reality experience relating to the extended reality information. For example, the extended reality experience includes threshold access network characteristics to activate the extended reality experience and/or threshold user device characteristics to activate the extended reality experience.

As further shown in FIG. 4, process 400 may include obtaining access network information relating to a set of access networks available to the user device and user device information relating to the user device (block 420). For example, the device (e.g., using computing resource 225, processor 320, memory 330, storage component 340, input component 350, output component 360, communication interface 370 and/or the like) may obtain access network information relating to a set of access networks available to the user device and user device information relating to the user device, as described above. In some implementations, process 400 includes determining that the access network information satisfies the threshold access network characteristics and/or the user device information satisfies the threshold user device characteristics.

As further shown in FIG. 4, process 400 may include determining an access network of the set of access networks to use for the extended reality experience based on the access network information and the user device information (block 430). For example, the device (e.g., using computing resource 225, processor 320, memory 330, storage component 340, input component 350, output component 360, communication interface 370 and/or the like) may determine an access network of the set of access networks to use for the extended reality experience based on the access network information and the user device information, as described above. In some implementations, process 400 may include determining the access network using a first machine learning model. For example, process 400 may include determining the access network by inputting the access network information and the user device information into the first machine learning model, and by receiving information identifying the access network from the first machine learning model.

As further shown in FIG. 4, process 400 may include determining, based on determining the access network, a first portion of the extended reality experience to execute locally at the user device or a second portion to execute remotely from the user device (block 440). For example, the device (e.g., using computing resource 225, processor 320, memory 330, storage component 340, input component 350, output component 360, communication interface 370 and/or the like) may determine a first portion of the extended reality experience to execute locally at the user device or a second portion to execute remotely from the user device, as described above. In some implementations, determining the first portion or the second portion includes determining that the first portion comprises an entirety of the extended reality experience, and that the entirety of the extended reality experience is to execute locally at the user device. In some implementations, determining the first portion or the second portion includes determining that the second portion comprises the entirety of the extended reality experience, and that the entirety of the extended reality experience is to execute remotely from the user device. In some implementations, determining the first portion or the second portion includes determining that a combination of the first portion and the second portion comprises the entirety of the extended reality experience.

As further shown in FIG. 4, process 400 may include sending, based on determining the access network and determining the first portion or the second portion, an instruction to the user device to cause the user device to use the access network for the extended reality experience and execute the first portion locally or the second portion remotely (block 450). For example, the device (e.g., using computing resource 225, processor 320, memory 330, storage component 340, input component 350, output component 360, communication interface 370 and/or the like) may send an instruction to the user device to cause the user device to use the access network for the extended reality experience and execute the first portion locally or the second portion remotely, as described above. In some implementations, the instruction may indicate that the user device is to execute the second portion remotely via a cloud computing platform or a distributed computing platform.

Process 400 may include receiving a request to register the extended reality experience. Additionally, or alternatively, process 400 may include obtaining the machine learning model to predict access networks to use for the extended reality experience, the first machine learning model having been trained based on historical information regarding one or more extended reality experiences, historical information regarding a plurality of access networks used to deliver the one or more extended reality experiences, historical information regarding a plurality of user devices to which the one or more extended reality experiences were delivered.

Additionally, or alternatively, process 400 may include obtaining a second machine learning model to determine a manner in which to execute the extended reality experience, the second machine learning model having been trained based on the historical information regarding the one or more extended reality experiences, the historical information regarding the plurality of access networks used to deliver the one or more extended reality experiences, and the historical information regarding the plurality of user devices to which the one or more extended reality experiences were delivered. In some implementations, process 400 may include obtaining the second machine learning model by training the second machine learning model based on the historical information regarding the one or more extended reality experiences, the historical information regarding the plurality of access networks used to deliver the extended reality experience, and the historical information regarding the plurality of user devices to which the one or more extended reality experiences were delivered. In some implementations, process 400 may include obtaining the second machine learning model from another device that trained the second machine learning model to determine the manner in which to execute the extended reality experience.

Additionally, or alternatively, process 400 may include obtaining a third machine learning model to determine content for the extended reality experience, the third machine learning model having been trained based on the historical information regarding the one or more extended reality experiences, the historical information regarding the plurality of access networks used to deliver the one or more extended reality experiences, and the historical information regarding the plurality of user devices to which the one or more extended reality experiences were delivered. In some implementations, process 400 may include determining the content for the extended reality experience using the third machine learning model.

Additionally, or alternatively, process 400 may include receiving, after or during execution of the extended reality experience, performance information and/or feedback relating to performance of the extended reality experience. Additionally, or alternatively, process 400 may include updating, based on the feedback and/or the performance information, the first machine learning model and/or the second machine learning model. Additionally, or alternatively, process 400 may include transmitting the feedback and/or the performance information to optimize content of the extended reality experience.

In some implementations, the historical information regarding the one or more extended reality experiences includes, for a particular extended reality experience of the one or more extended reality experiences, information regarding at least one of a type of the particular extended reality experience, content of the particular extended reality experience, a threshold user device requirement to activate the particular extended reality experience, a threshold access network requirement to activate the particular extended reality experience, or performance information of the particular XR experience. Additionally, or alternatively, the historical information regarding the plurality of access networks includes, for a particular access network of the plurality of access networks, information regarding at least one of a type of the particular access network, a download speed of the particular access network, an upload speed of the particular access network, a latency of the particular access network, an availability of the particular access network, or an amount of congestion for the particular access network. In some implementations, the historical information regarding the plurality of user devices includes, for a particular user device of the plurality of user devices, information regarding at least one of a type of the particular user device, a capability of the particular user device, a location of the particular user device, or a velocity of the particular user device.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a request to register an extended reality experience;
obtaining, by the device, a machine learning model to predict access networks to use for the extended reality experience;
wherein obtaining the machine learning model comprises training the machine learning model based on historical information regarding one or more historical extended reality experiences, historical information regarding a plurality of access networks used to deliver the one or more historical extended reality experiences, and historical information regarding a plurality of user devices to which the one or more historical extended reality experiences were delivered;
receiving, by the device and from a user device, a request to activate the extended reality experience;
obtaining, by the device, access network information relating to a set of access networks available to the user device and user device information relating to the user device;
determining, by the device and based on the access network information and the user device information, an access network, of the set of access networks, to use for the extended reality experience;
determining, by the device and based on determining the access network, a first portion of the extended reality experience to execute locally at the user device or a second portion of the extended reality experience to execute remotely from the user device; and
sending, by the device, an instruction to the user device to use the access network for the extended reality experience and execute the first portion locally or the second portion remotely.

2. The method of claim 1, wherein the request to register the extended reality experience includes extended reality information relating to the extended reality experience;
wherein the extended reality information relating to the extended reality experience includes threshold characteristics to activate the extended reality experience; and
wherein, prior to determining the access network, the method further comprises determining that the access network information and the user device information satisfy the threshold characteristics.

3. The method of claim 1,
wherein the historical information regarding the one or more historical extended reality experiences includes, for a particular historical extended reality experience of the one or more historical extended reality experiences, information regarding at least one of a type of the particular historical extended reality experience, content of the particular historical extended reality experience, a threshold user device characteristic to activate the particular historical extended reality experience, an optimal user device characteristic to activate the particular historical extended reality experience, a threshold access network characteristic to activate the particular historical extended reality experience, an optimal access network characteristic to activate the particular historical extended reality experience, or performance information of the particular historical extended reality experience;
wherein the historical information regarding the plurality of access networks includes, for a particular access network of the plurality of access networks, information regarding at least one of a type of the particular access network, a download speed of the particular access network, an upload speed of the particular access network, a latency of the particular access network, an availability of the particular access network, or an amount of congestion for the particular access network; and
wherein the historical information regarding the plurality of user devices includes, for a particular user device of the plurality of user devices, information regarding at least one of a type of the particular user device, a capability of the particular user device, a location of the particular user device, or a velocity of the particular user device.

4. The method of claim 1, wherein determining the access network comprises:
inputting the access network information and the user device information into the machine learning model; and
receiving information identifying the access network from the machine learning model.

5. The method of claim 1, wherein determining the first portion or the second portion comprises determining that the first portion comprises an entirety of the extended reality experience and the second portion comprises none of the extended reality experience,
wherein the entirety of the extended reality experience is to execute locally at the user device.

6. The method of claim 1, wherein determining the first portion or the second portion comprises determining that the second portion comprises an entirety of the extended reality experience and the first portion comprises none of the extended reality experience,
wherein the entirety of the extended reality experience is to execute remotely from the user device.

7. The method of claim 1, further comprising:
receiving, after or during execution of the extended reality experience, performance information relating to performance of the extended reality experience; and
updating, based on the performance information, the machine learning model.

8. A device, comprising:
one or more processors, configured to:
receive a request to register an extended reality experience, wherein the request includes extended reality information relating to the extended reality experience;
obtain a first machine learning model to predict access networks to use for the extended reality experience; wherein the one or more processors, to obtain the first machine learning model, are to train the machine learning model based on historical information regarding one or more historical extended reality experiences, historical information regarding a plurality of access networks used to deliver the one or more historical extended reality experiences, historical information regarding a plurality of user devices to which the one or more historical extended reality experiences were delivered;
obtain a second machine learning model to determine a manner in which to execute the extended reality experience;
receive, from a user device, a request to activate the extended reality experience;
obtain access network information relating to a set of access networks available to the user device and user device information relating to the user device;
determine, using the first machine learning model, an access network, of the set of access networks, to use for the extended reality experience based on the access network information and the user device information;
determine, using the second machine learning model, a first portion of the extended reality experience to execute locally at the user device or a second portion of the extended reality experience to execute remotely from the user device based on a subset of the access network information relating to the access network and the user device information; and
send, based on determining the access network and determining the first portion or the second portion, an instruction to the user device to cause the user device to use the access network for the extended reality experience and execute the first portion locally or the second portion remotely.

9. The device of claim 8, wherein the extended reality information relating to the extended reality experience includes one or more threshold access network characteristics and one or more threshold user device characteristics to activate the extended reality experience; and
wherein the one or more processors, prior to determining the access network, are further configured to:
determine that the access network information satisfies the one or more threshold access network characteristics; and
determine that the user device information satisfies the one or more threshold user device characteristics.

10. The device of claim 8, wherein the one or more processors, to obtain the first machine learning model, are configured to select the first machine learning model from a repository of machine learning models; and
wherein the one or more processors, to obtain the second machine learning model, are configured to select the second machine learning model from the repository of machine learning models.

11. The device of claim 8, wherein the one or more processors, to determine the first portion or the second portion, are configured to determine that a combination of the first portion and the second portion comprises an entirety of the extended reality experience; and
wherein the one or more processors, to send the instruction, are configured to send the instruction to the user device to cause the user device to execute the first portion locally and the second portion remotely.

12. The device of claim 8, wherein the one or more processors, to determine the first portion or the second portion, are configured to determine the second portion; and
wherein the one or more processors, to send the instruction, are configured to send the instruction to the user device to cause the user device to execute the second portion remotely via a cloud computing platform or a distributed computing platform.

13. The device of claim 8,
wherein the one or more processors, to obtain the second machine learning model, are configured to train the second machine learning model based on the historical information regarding the one or more historical extended reality experiences, the historical information regarding the plurality of access networks used to deliver the one or more historical extended reality experiences, and the historical information regarding the plurality of user devices to which the one or more historical extended reality experiences were delivered; and
wherein the one or more processors are further configured to:
receive, after or during execution of the extended reality experience, performance information relating to performance of the extended reality experience; and
update, based on the performance information, the first machine learning model and the second machine learning model.

14. The device of claim 8, wherein the one or more processors are further configured to:
receive, after or during execution of the extended reality experience, performance information relating to performance of the extended reality experience; and
transmit the performance information to optimize content of the extended reality experience.

15. A non-transitory computer-readable medium storing instructions, the instructions comprising:
one or more instructions that, when executed by one or more processors, cause the one or more processors to:
receive a request to register an extended reality experience, wherein the request includes information regarding the extended reality experience;
obtain a machine learning model to determine a manner in which to execute the extended reality experience, the machine learning model having been trained based on historical information regarding one or more historical extended reality experiences, historical information regarding a plurality of access networks used to deliver the one or more historical extended reality experiences, and historical information regarding a plurality of user devices to which the one or more historical extended reality experiences were delivered;
receive, from a user device, a request to activate the extended reality experience;
obtain access network information relating to a set of access networks available to the user device and user device information relating to the user device;

determine an access network, of the set of access networks, to use for the extended reality experience;

determine, using the machine learning model, a first portion of the extended reality experience to execute locally at the user device or a second portion of the extended reality experience to execute remotely from the user device based on a subset of the access network information relating to the access network and the user device information; and send, based on determining the access network and determining the first portion or the second portion, an instruction to the user device to cause the user device to use the access network for the extended reality experience and execute the first portion locally or the second portion remotely.

16. The non-transitory computer-readable medium of claim 15, wherein the one or more instructions, that cause the one or more processors to obtain the machine learning model, cause the one or more processors to train the machine learning model based on the historical information regarding the one or more historical extended reality experiences, the historical information regarding the plurality of access networks used to deliver the one or more historical extended reality experiences, and the historical information regarding the plurality of user devices to which the one or more historical extended reality experiences were delivered.

17. The non-transitory computer-readable medium of claim 15, wherein the one or more instructions, that cause the one or more processors to obtain the machine learning model, cause the one or more processors to obtain the machine learning model from another device that trained the machine learning model to determine the manner in which to execute the extended reality experience.

18. The non-transitory computer-readable medium of claim 15, wherein the machine learning model is a first machine learning model, and wherein the one or more instructions, when executed by the one or more processors, further cause the one or more processors to obtain a second machine learning model to predict access networks to use for the extended reality experience, the second machine learning model having been trained based on the historical information regarding the one or more historical extended reality experiences, the historical information regarding the plurality of access networks used to deliver the one or more historical extended reality experiences, and the historical information regarding the plurality of user devices to which the one or more historical extended reality experiences were delivered; and wherein the one or more instructions, that cause the one or more processors to determine the access network, cause the one or more processors to determine the access network using the second machine learning model.

19. The non-transitory computer-readable medium of claim 15, wherein the machine learning model is a first machine learning model, and wherein the one or more instructions, when executed by the one or more processors, further cause the one or more processors to:

obtain a second machine learning model to determine content for the extended reality experience, the second machine learning model having been trained based on the historical information regarding the one or more historical extended reality experiences, the historical information regarding the plurality of access networks used to deliver the one or more historical extended reality experiences, and the historical information regarding the plurality of user devices to which the one or more historical extended reality experiences were delivered; and determine, using the second machine learning model and based on the access network information and the user device information, the content for the extended reality experience.

20. The non-transitory computer-readable medium of claim 15, wherein the one or more instructions, when executed by the one or more processors, further cause the one or more processors to:

receive, after or during execution of the extended reality experience, feedback relating to performance of the extended reality experience;

update, based on the feedback, the machine learning model; and transmit the feedback to optimize content of the extended reality experience.

* * * * *